T. DOUGLAS.
ENDLESS TREAD FOR AUTOMOBILE WHEELS.
APPLICATION FILED APR. 23, 1912.
1,077,129.
Patented Oct. 28, 1913.
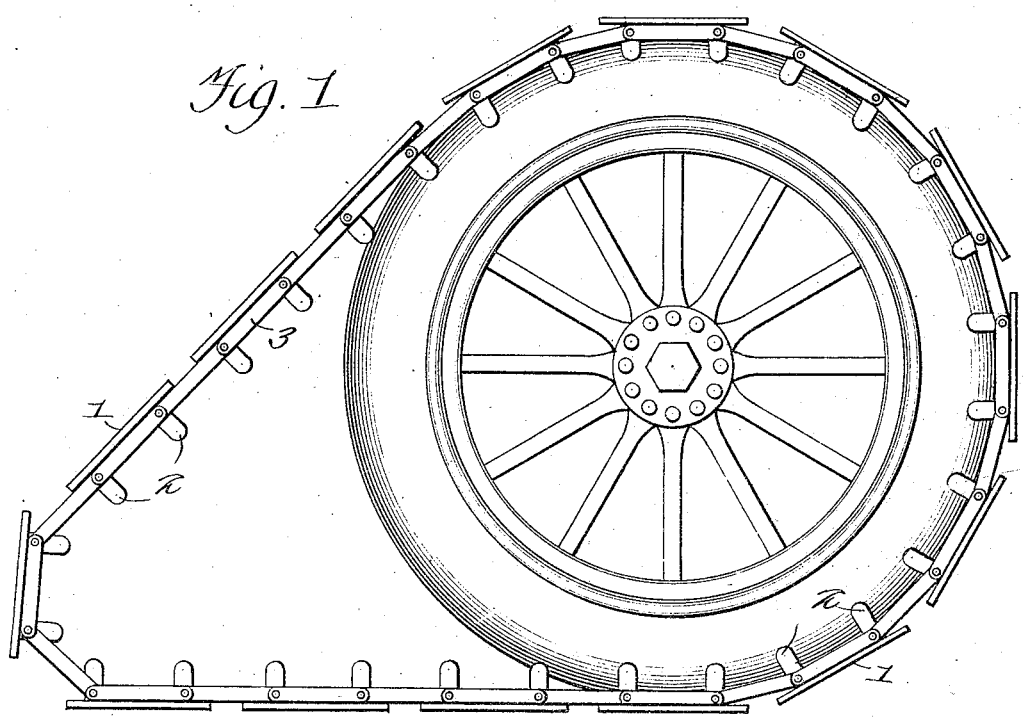
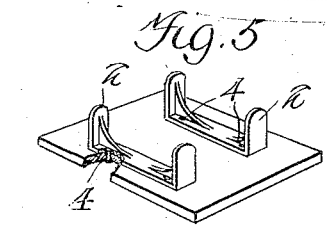
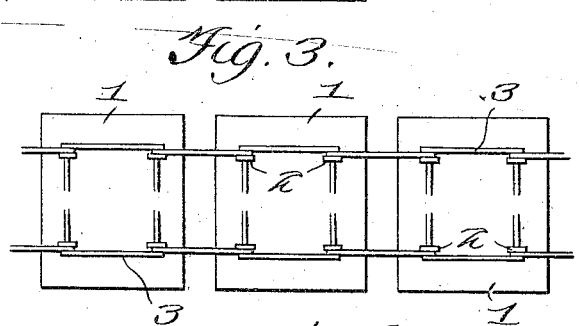
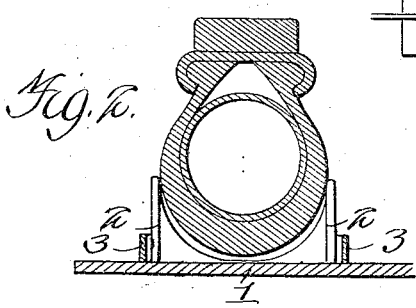
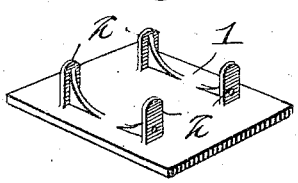
Witnesses
Hugh Ott
U. B. Hillyard
Inventor
Theodore Douglas
By Victor J. Evans
Attorney

UNITED STATES PATENT OFFICE.

THEODORE DOUGLAS, OF NEW YORK, N. Y.

ENDLESS TREAD FOR AUTOMOBILE-WHEELS.

1,077,129.    Specification of Letters Patent.    Patented Oct. 28, 1913.

Application filed April 23, 1912. Serial No. 692,676.

*To all whom it may concern:*

Be it known that I, THEODORE DOUGLAS, a citizen of the United States, residing at New York, in the county of New York and State of New York, have invented new and useful Improvements in Endless Treads for Automobile-Wheels, of which the following is a specification.

The primary purpose of this invention is the provision of a tread attachment designed chiefly for the wheels of automobiles to carry the same over sandy places, snow covered surfaces and soft places in the road, said attachment being of an endless nature and capable of being readily placed in position or removed with facility when not required for immediate use to be stored in the machine as a part of the equipment.

The invention consists of a plurality of shoes of peculiar formation and an endless chain having the shoes attached thereto, the whole being adapted to be fitted to the automobile wheel so as to materially increase the extent of tread surface, thereby preventing the wheel from sinking in sand, mud or snow.

The invention consists of the novel features, details of construction and combination of parts, which hereinafter will be more particularly set forth, illustrated in the accompanying drawing, and pointed out in the appended claims.

Referring to the drawing, forming a part of the specification, Figure 1 is a side view of an automobile wheel provided with an endless tread attachment embodying the invention. Fig. 2 is a cross section of the rim of the wheel and the attachment. Fig. 3 is a top plan view of a portion of the tread attachment, showing the same on a larger scale. Fig. 4 is a detail view of one of the shoes. Fig. 5 is a detail view of a modified form of shoe.

Corresponding and like parts are referred to in the following description, and indicated in all the views of the drawing, by the same reference characters.

The device comprises a plurality of shoes each of like formation and an endless chain having the shoes attached thereto. The shoes may be formed in any manner, each consisting of a base 1 and lugs 2, the latter being spaced apart a distance depending upon the size of the tire for which the attachment is designed, it being understood in this connection that the endless treads are provided in standard sizes to adapt them to the different sizes of automobile tires. The lugs 2 serve the dual purpose of preventing lateral displacement of the attachment and also as convenient means for connecting the shoes to the endless chains. The lugs taper, their wider ends being adjacent the base 1. The outer faces of the lugs are preferably straight, whereas their inner faces incline or curve slightly to conform to the outline of the tire in cross section. When the base 1 of the shoe is broad it is provided with four lugs, two upon each side of a medial line. In the preferable construction the shoes are formed as a casting and may be light consistent with strength and durability. Two endless chains 3 are provided and are arranged so as to come upon opposite sides of the tire to which the attachment may be fitted. The endless chains may be of any construction and are connected to the lugs of the shoes by bolts, rivets or other fastening means.

The attachment may be folded into a small space so as to be conveniently carried upon the automobile as an accessory part of the equipment to be brought into use when required to carry the machine over a sandy place, a soft spot in the road or over snow and slush. It is to be understood that the endless tread may be separated at any point in its length to admit of placing an end portion of the tread in advance of the wheel so that movement of the machine may cause the wheel to ride upon the device when the ends may be brought together and coupled, this manner of application being substantially the same as practised in the application of tire chains to automobile wheels. After the machine has cleared the sand, mud, snow or other soft spot in the road the tread attachment may be easily and quickly removed from the wheel and placed in the machine.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

It may be desirable to construct the base 1 and the lugs separately, thereby admitting of the base being replaced when worn as well as admitting of the base and lugs being formed of different material. In the construction illustrated in Fig. 5 the base 1 is separate from the lugs 2 and the latter may be secured to the base in any manner.

The base may consist of metal, papier-mâché, wood or other material and the lugs may be formed as castings or constructed in any manner, the same being secured to the base preferably by means of rivets 4.

The attachment may fit close to the tire of the wheel or may be loose, as indicated in Fig. 1.

Each of the base pieces is flat and of such extent as to support the wheel and prevent its sinking into soft places in the surface. The lugs 2 are set in some distance from the front and rear edges of the base piece so that the links of the connecting chain may obtain a bracing support on such edge portions of the base pieces exterior to the lugs to support the upper run of the attachment, as shown in Fig. 1 of the drawing.

Having thus described the invention what is claimed as new, is:—

1. An endless tread attachment for automobile and vehicle wheels, the same comprising a plurality of flat shoes having lugs upon one side set in from the front and rear edges, and links connecting such shoes and pivoted to the lugs thereof to form an endless chain, the upper portion of the attachment being supported by means of the links obtaining a bracing action against the front and rear edge portions of the shoes exterior to the lugs.

2. An endless tread attachment for automobile and vehicle wheels, the same comprising a plurality of flat shoes having lugs upon one side arranged at some distance from the front and rear edges of the shoes, said lugs having tapered portions upon their inner sides to form bracing connections and to provide a seat for receiving the tire of the wheel, and links pivotally connected with the lugs and forming endless chains, the upper portion of the attachment being supported by a bracing action of the links against the front and rear edge portions of the shoes exterior to the lugs.

In testimony whereof I affix my signature in presence of two witnesses.

THEODORE DOUGLAS.

Witnesses:
H. L. BUTLER,
J. F. COOPER.

---

Copies of this patent may be obtained for five cents each, by addressing the "Commissioner of Patents, Washington, D. C."